(12) United States Patent
Koide

(10) Patent No.: US 6,515,255 B1
(45) Date of Patent: Feb. 4, 2003

(54) PROCESSING METHOD OF DISCHARGE NOZZLE FOR LIQUID JET RECORDING HEAD AND MANUFACTURING METHOD OF LIQUID JET RECORDING HEAD

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/603,189

(22) Filed: Jun. 26, 2000

(30) Foreign Application Priority Data

Jun. 29, 1999 (JP) .......................................... 11-182921

(51) Int. Cl.[7] .............................................. B23K 26/38
(52) U.S. Cl. ................................ 219/121.71; 219/121.7
(58) Field of Search ........................ 219/121.7, 121.71; 29/890.1; 216/27, 65; 347/47

(56) References Cited

U.S. PATENT DOCUMENTS

| 4,092,515 A | * | 5/1978 | Joslin et al. | |
| 4,948,941 A | * | 8/1990 | Altman et al. | 219/121.71 |
| 5,408,738 A | * | 4/1995 | Schantz et al. | 29/890.1 |
| 5,594,479 A | * | 1/1997 | Inoue et al. | 347/47 |
| 5,657,539 A | | 8/1997 | Orikasa et al. | 219/121.71 |
| 6,120,131 A | * | 9/2000 | Murthy et al. | 347/47 |
| 6,256,883 B1 | * | 7/2001 | Kinoshita | 347/47 |
| 6,426,481 B1 | * | 6/2002 | Koide et al. | 219/121.71 |
| 2002/0062563 A1 | * | 5/2002 | Koide et al. | 29/890.1 |

FOREIGN PATENT DOCUMENTS

| EP | 0 761 448 | | 3/1997 |
| EP | 968824 A1 | * | 1/2000 |
| JP | 8-132260 | | 5/1996 |
| JP | 9-118017 | | 5/1997 |

* cited by examiner

*Primary Examiner*—Geoffrey S. Evans
(74) *Attorney, Agent, or Firm*—Fitzpatrick, Cella, Harper & Scinto

(57) ABSTRACT

A processing method for processing a discharge nozzle in a liquid jet recording head includes the steps of: providing a surface of the discharge port formation plate on the liquid discharge side with a sacrifice layer made of material capable of being processed by the laser light; processing and forming a discharge nozzle on the discharge port formation plate by irradiation of laser light; and removing the sacrifice layer.

16 Claims, 5 Drawing Sheets

PROCESSING METHOD OF DISCHARGE NOZZLE FOR LIQUID JET RECORDING HEAD AND MANUFACTURING METHOD OF LIQUID JET RECORDING HEAD

BACKGROUND OF THE INVENTION

1. Field of the Invention

The present invention relates to a processing method for a discharge nozzle which sublimes and processes, by means of laser light, a discharge nozzle in a liquid jet recording head for adhering droplets on a recording medium by flying droplets of recording liquid or the like, and a manufacturing method for a liquid jet recording head.

2. Related Background Art

In a liquid jet recording apparatus (ink jet printer) for adhering droplets on a recording medium by flying droplets of recording liquid such as ink, printing quality much depends upon characteristic properties of a nozzle portion, which is a portion for discharging recording liquid, and the characteristic properties of this nozzle portion are substantially determined by a variation in nozzle diameter and shape of the nozzle. As the generally used two methods to form this nozzle, there are a method of forming using a metallic plate in accordance with an electroforming method or an electrical discharge method, and a method of subliming and processing high polymeric organic resin material using a high energy laser such as an ultraviolet laser represented by an excimer laser. The latter, a fine processing method using ultraviolet lasers, has generally been employed.

In this ultra violet laser processing method, when processed at a suitable laser energy density to sublime and process. high polymeric organic resin material, there is provided so-called taper-shaped processing characteristic properties in which the processing area gradually decreases from the laser incoming radiation side to the laser outgoing radiation side. The shape of the nozzle required in order to raise the printing quality of the liquid jet recording head is a tapered configuration, which tapers toward the discharge side of the recording liquid. Therefore, the laser processing method has been performed by laser irradiation from the supply side of the recording liquid, that is, concerning a plate for forming the discharge nozzle, there has been adopted a process of combining the plate with a member for supplying the recording liquid after the discharge nozzle is processed and formed.

The discharge nozzle, however, typically requires a length of several tens $\mu$m to about 100 $\mu$m in terms of the printing quality, and the thickness of the plate for forming this nozzle has naturally also the same dimension. This discharge port formation plate is a very thin, easily transformable member, must be laser processed from the liquid supply side, and must be combined with a member of supplying the recording liquid after the discharge nozzle is formed by processing. This has led to a problem that after the combination, stresses cause deformation in the discharge port formation plate, a plurality of discharge nozzles lined up in the same direction cannot be formed, but the discharge direction of the recording liquid becomes random, thus deteriorating the printing quality.

In order to solve such a problem, there has been proposed a method of processing and forming the discharge nozzle after the liquid jet recording head is assembled, that is, a discharge nozzle processing method for subliming and forming discharge nozzles of a tapered configuration, which tapers in the liquid discharge direction, on the discharge port formation plate by bringing a mask plate, on which a shape of the discharge port to be formed has been patterned, into tight contact with the discharge port formation plate, on which a plurality of discharge ports in the liquid jet recording head are formed, on the liquid discharge side, and irradiating high energy ultra violet laser from the mask plate side.

However, in the method of processing and forming the discharge nozzle after the above described liquid jet recording head is assembled, since the discharge nozzle is processed and formed by irradiating laser light from the outside, which is the liquid discharge side of the discharge port formation plate, there arises a problem that the irradiation of the laser light deteriorates a repellent coated layer on the liquid discharge-side surface of the discharge port formation plate, thus lowering the water repellency. Further, there arises a problem that a fusing phenomenon due to heat accumulation of the laser light irradiation and some optical blurring at the outer periphery of the laser irradiation pattern cause an edge of the discharge nozzles on the liquid discharge side to become inactive as shown in FIG. 4.

A sharp edge of the discharge nozzle on the liquid discharge side is very important to determine the discontinuation effect of the recording liquid during liquid discharge and the direction of flying of droplets, and therefore, there arises a problem that the inactive edge on the liquid discharge side causes errors in placement positions of droplets or mist due to dispersion of droplets.

In addition, a secondary product (debris) caused by the laser processing disperses within liquid passages in the liquid jet recording head, and the surface energy and hydrophilic force of the debris thus dispersed affects the flow of recording liquid and adheres to a heating conductor for generating discharge energy of the recording liquid. Thus, this contaminated heating conductor deteriorates the heat generating efficiency.

SUMMARY OF THE INVENTION

One of objects according to the present invention is to provide a processing method of a discharge nozzle for a liquid jet recording head and a manufacturing method of the liquid jet recording head capable of forming the edge of the discharge nozzle on the liquid discharge side sharp without causing any damage to the repellent layer on the surface, on the liquid discharge side, of the discharge port formation plate when laser processing the discharge nozzle by means of irradiation of laser light from the liquid discharge side of the discharge port formation plate in the liquid jet recording head, and further of stabilizing the discharge of droplets and improving the printing quality by excluding secondary products which disperse and adhere within liquid passages in the liquid jet recording head.

It is another object according to the present invention to provide a processing method for a discharge nozzle in a liquid jet recording head for processing and forming the discharge nozzle on a discharge port formation plate by irradiation of laser light from the liquid discharge side of the discharge port formation plate of the liquid jet recording head, comprising the steps of providing a surface of the discharge port formation plate on the liquid discharge side with a sacrifice layer made of material capable of being processed by the laser light; processing and forming a discharge nozzle on the discharge port formation plate by irradiation of laser light; and removing the sacrifice layer.

Also, it is a further object according to the present invention to provide a processing method for a discharge nozzle in a liquid jet recording head for processing and forming the discharge nozzle on a discharge port formation plate by irradiation of laser light from the liquid discharge side of the discharge port formation plate of the liquid jet recording head, comprising the steps of: providing sacrifice layers made of material capable of being processed by the laser light for both surfaces of the discharge port formation plate on the liquid discharge side and on the liquid supply side, or the surface of the discharge port formation plate on the liquid discharge side and wall surface of the liquid passage; processing and forming a discharge nozzle on said discharge port formation plate by irradiation of laser light; and removing the sacrifice layer.

In a processing method for the discharge nozzle for the liquid jet recording head according to the present invention, it is preferable to use water-soluble resin as the sacrifice layer, to form the sacrifice layer by applying the water-soluble resin, and to remove the water-soluble resin as the sacrifice layer by rinsing after the discharge nozzle is processed. Also, it is preferable to use resinous film as the sacrifice layer, to vacuum bond the resinous film onto the surface of the discharge port formation plate on the liquid discharge side, and to remove the resinous film as the sacrifice layer by mechanically peeling after the discharge nozzle is processed.

In a processing method for a discharge nozzle for a liquid jet recording head according to the present invention, it is possible to arrange the structure such that a high energy ultra violet laser is used as a laser used to process the discharge nozzle, and resin as the sacrifice layer and the discharge port formation plate are sublimed and processed by a photo-chemical reaction process, or it is also possible to arrange the structure such that a high energy short pulse oscillation laser is used as a laser used to process the discharge nozzle, and resin as the sacrifice layer and the discharge port formation plate are sublimed and processed by a thermo-chemical reaction process.

It is an another object according to the present invention to provide a method for manufacturing a liquid jet recording head for processing and forming a discharge nozzle on a discharge port formation plate by irradiation of laser light from the liquid discharge side of the discharge port formation plate of the liquid jet recording head, the method comprising the steps of: providing the surface of the discharge port formation plate on the liquid discharge side with a sacrifice layer made of material capable of being processed through the laser light; processing and forming the discharge nozzle on the discharge port formation plate by irradiation of laser light; and removing the sacrifice layer.

Also, it is an additional object according to the present invention to provide a method for manufacturing a liquid jet recording head for processing and forming a discharge nozzle on a discharge port formation plate by irradiation of laser light from the liquid discharge side of the discharge port formation plate of the liquid jet recording head, the method comprising the steps of: providing sacrifice layers made of material capable of being processed through the laser light for both surfaces of the discharge port formation plate on the liquid discharge side and on the liquid supply side, or the surface of the discharge port formation plate on the liquid discharge side and a wall surface of the liquid passage; processing and forming the discharge nozzle on the discharge port formation plate by irradiation of laser light; and removing the sacrifice layer.

In a manufacturing method for a liquid jet recording head according to the present invention, it is preferable to process and form the discharge nozzle by irradiation of laser light from the discharge port formation plate on the liquid discharge side after, of each member constituting the entire liquid jet recording head, the discharge port formation plate, on which at least a plurality of discharge ports are formed, and a member for holding the discharge port formation plate are combined.

In a manufacturing method for a liquid jet recording head according to the present invention, it is preferable to use water-soluble resin as the sacrifice layer, to form a sacrifice layer by applying the water-soluble resin, and to remove the water-soluble resin as the sacrifice layer by rinsing after the discharge nozzle is processed. Also, it is preferable to use resinous film as the sacrifice layer, to vacuum bond the resinous film onto the surface of the discharge port formation plate on the liquid discharge side, and to remove the resinous film as the sacrifice layer by mechanically peeling after the discharge nozzle is processed.

In a manufacturing method for a liquid jet recording head according to the present invention, it is possible to arrange the structure such that a high energy ultra violet laser is used as a laser used to process the discharge nozzle, and resin as the sacrifice layer and the discharge port formation plate are sublimed and processed by a photo-chemical reaction process, or it is also possible to arrange the structure such that a high energy short pulse oscillation laser is used as a laser used to process the discharge nozzle, and resin as the sacrifice layer and the discharge port formation plate are sublimed and processed by a thermo-chemical reaction process.

In a manufacturing method for a liquid jet recording head according to the present invention, it is preferable that the surface of the discharge port formation plate on the liquid discharge side be formed with a repellent layer, which has been coated with water repellent in advance.

According to the present invention, it becomes possible to form the edge of the discharge nozzle on the liquid discharge side in a sharp shape, and the repellent layer on the surface of the orifice plate on the liquid discharge side is not subjected to any degradation and damages caused by the irradiation of laser light because of the existence of the sacrifice layer, but can be protected. Further, the inside surface of the orifice plate on the liquid supply side and the liquid passage wall surface within the liquid jet recording head are attached with sacrifice layers, and the sacrifice layers are removed after laser processing, whereby it is possible to exclude debris, which is a secondary product caused in the laser processing, and to prevent the interior of the liquid jet recording head from being contaminated by debris. Therefore, it is possible to stabilize the discharge of droplets and to improve the flying speed of the droplets, thus remarkably improving the printing quality of the liquid jet recording head and enabling high-speed printing.

BRIEF DESCRIPTION OF THE DRAWINGS

FIG. 7A is a top view, FIG. 7B is a front view and FIG. 7C is a side view.

DETAILED DESCRIPTION OF THE PREFERRED EMBODIMENTS

With reference to the drawings, a description will be made of embodiments according to the present invention.

Figure 1:
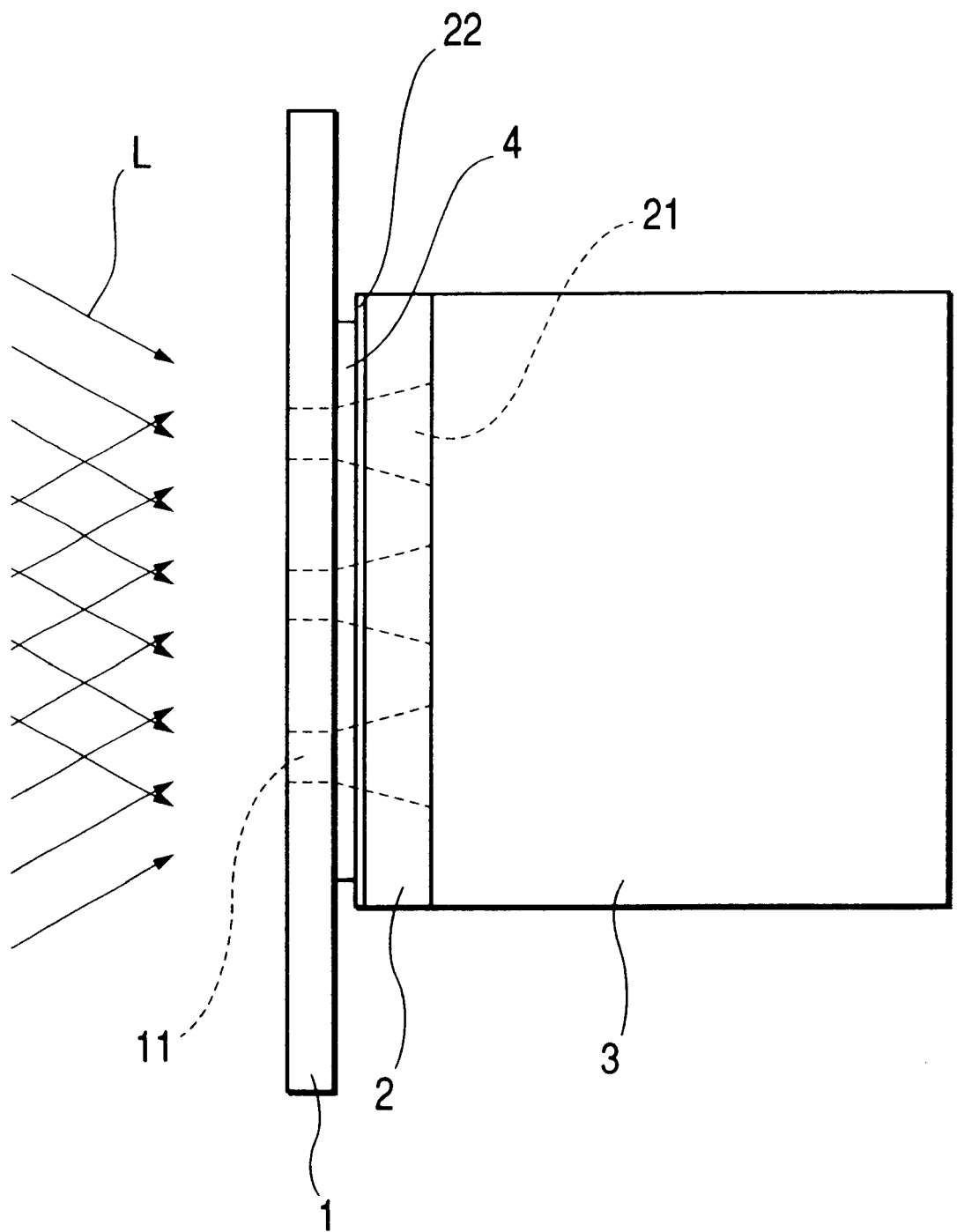
FIG. 1 is a schematic view showing a processing method for a discharge nozzle for a liquid jet recording head according to a first embodiment of the present invention.

FIG. 1 is a schematic view showing a processing method for discharge nozzles for a liquid jet recording head according to the first embodiment of the present invention, and hereinafter, a detailed description will be made of the processing method for discharge nozzles according to the first embodiment of the present invention.

In FIG. 1, reference numeral 1 denotes a mask plate, on which a pattern 11 corresponding to the shape of each discharge port to be formed has been formed; 2, a discharge port formation plate (hereinafter, referred to also as an "orifice plate") made of macromolecular organic material, on whose surface on the liquid discharge side a repellant layer 22 has been formed in advance, and in which discharge nozzles 21 are to be formed; 3, a liquid jet recording head body that is equipped with liquid passages and a common liquid chamber (not shown in FIG. 1) therein and configures a liquid jet recording head by combining with the orifice plate 2; and 4, a membrane or film made of material capable of being processed by laser light to be used in the case of processing the discharge nozzles 21, and the membrane or film (hereinafter, referred to as "sacrifice layer") which is brought into tight contact with the surface of the orifice plate 2 on the liquid discharge side for joining before laser material processing, and which can be peeled for removing by a chemical or physical method after the laser material processing.

When laser processing of the discharge nozzles 21 is performed, the liquid jet recording head is formed by installing the orifice plate 2 onto the liquid jet recording head body 3, a sacrifice layer 4 made of resin material, such as PVA (polyvinyl alcohol) in preferred embodiments, capable of being processed by laser light, is brought into tight contact with the surface, for joining, (hereinafter, the surface of the orifice plate on the liquid discharge side will be referred to as the "outside surface", and the surface on the liquid supply side, which is the opposite side, will be referred to as the "inside surface"), on the liquid discharge side, with the orifice plate 2 in the liquid jet recording head, and the mask plate 1, on which the pattern 11 corresponding to the shape of the discharge port has been formed in advance, is brought into tight contact through the sacrifice layer 4. Thus, a plurality of high energy ultraviolet laser light beams L is simultaneously irradiated in a direction inclined to a perpendicular line of the mask plate 1 from the liquid discharge side of the orifice plate 2, whereby the ultraviolet laser light L passing through the pattern 11 on the mask plate 1 sublimes and processes the sacrifice layer 4 and the orifice plate 2 in a direction of thickness thereof in the advancing direction of each laser line so that the orifice plate 2 is simultaneously formed with a plurality of discharge nozzles 21 having a tapered configuration which converge in the liquid discharge direction (toward the mask plate side).

Figure 4:
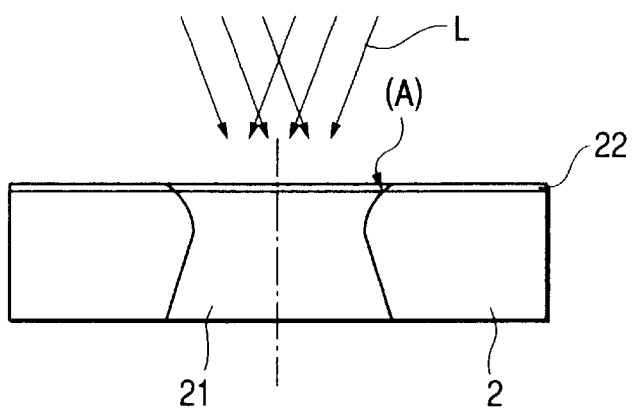
FIG. 4 is a schematic view showing a conventional processing shape for a discharge nozzle in a processing method for the discharge nozzle.

In conventional discharge nozzles to be formed by a processing method using the irradiation of laser light, as shown in FIG. 4, an inactive processed portion (A) occurs normally at the edge on the incoming radiation side of the ultraviolet laser light L because of a fusing phenomenon due to heat accumulation of the laser light irradiation and some optical blurring. When the discharge nozzles 21 for discharging the recording liquid are formed in the shape in which such inactive processed portion occurs, there has arisen a problem that the recording liquid cannot be correctly ejected as described above, but fine mist occurs when droplets are ejected.

Figure 3A:
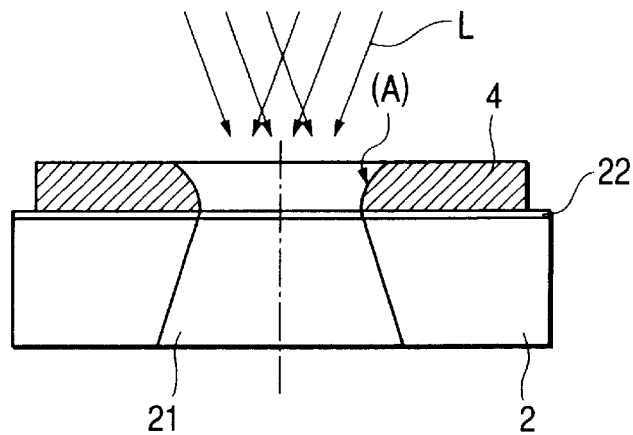
FIGS. 3A and 3B are schematic views showing a processing process for a discharge nozzle in a processing method for the discharge nozzle for the liquid jet recording head according to the present invention.
Figure 3B:
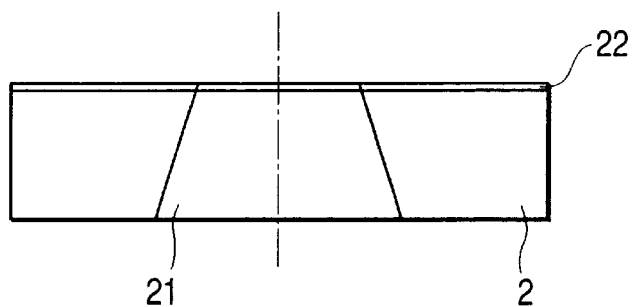

In the present embodiment, however, the sacrifice layer 4 is brought into tight contact with the outside surface of the orifice plate 2 on the incoming radiation side of the ultraviolet laser light L, and laser material processing is performed, whereby an inactive processed portion (A), which occurs because of a fusing phenomenon due to heat accumulation of the laser light irradiation and some optical blurring, occurs at the edge of the sacrifice layer 4 on the incoming radiation side of the laser light as shown in FIG. 3A. Accordingly, after the completion of processing of the discharge nozzles 21 due to the irradiation of laser light, the sacrifice layer 4 adhesion bonded on the outside surface of the orifice plate 2 is removed by a chemical or physical method, whereby the discharge nozzle 21 in the orifice plate 2 is formed such that the edge on the incoming radiation side (that is, liquid discharge side) of the laser light L has a sharp shape free of the inactive processed portion as shown in FIG. 3B. In this respect, in the case where soluble resin material is used as the sacrifice layer 4, the sacrifice layer 4 can be removed by rinsing it.

Also, since the discharge nozzle is processed by irradiating laser light after the sacrifice layer 4 is brought into tight contact with the outside surface of the orifice plate 2, a repellent layer 22 coated on the outside surface of the orifice plate 2 in advance is not directly irradiated by the laser light because it is covered with the sacrifice layer 4, but is not deteriorated nor damaged by the irradiation of laser light. Therefore, the repellent layer 22 can also be protected.

Concerning the adhesion bonding for joining of the sacrifice layer 4 on the outside surface of the orifice plate 2, in the case where there is used water-soluble resin capable of being processed by laser light as the sacrifice layer 4, it is possible to form the sacrifice layer by coating the outside surface of the orifice plate 2 with this water-soluble resin, and to remove the sacrifice layer made of water-soluble resin by rinsing it after the completion of processing. Also, in the case where resinous film is used as the sacrifice layer, it is also possible to adhesion bond, in vacuum, this resinous film onto the outside surface of the orifice plate 2, and to remove the sacrifice layer by mechanically peeling the resinous film after the completion of processing of the discharge nozzle.

In the above described description, the description has been made of a case where a high energy ultra violet laser is used as a laser to be used for processing the discharge nozzle, resin material capable of being processed using ultra violet laser light is used as the sacrifice layer, and the sacrifice layer and the orifice plate, which are made of resin material, are sublimed and processed by means of irradiation by a high energy ultra violet laser in a photo-chemical reaction process. As a laser to be used for processing the discharge nozzle, further a high energy short pulse oscillation laser can be also used, and in this case, as the sacrifice layer, there can be used ceramics, glass, a mineral and the like, which are capable of being processed by a high energy short pulse oscillation laser, as well as resin. The sacrifice layer and the orifice plate are sublimed and processed by means of the irradiation by this high energy short pulse oscillation laser in the thermo-chemical reaction process.

Next, with reference to FIG. 2, the description will be made of a processing method for a discharge nozzle in a liquid jet recording head according to a second embodiment of the present invention. In this respect, in the present embodiment, members identical to those in the above described first embodiment are designated by the identical reference numerals or characters for description.

Figure 2:
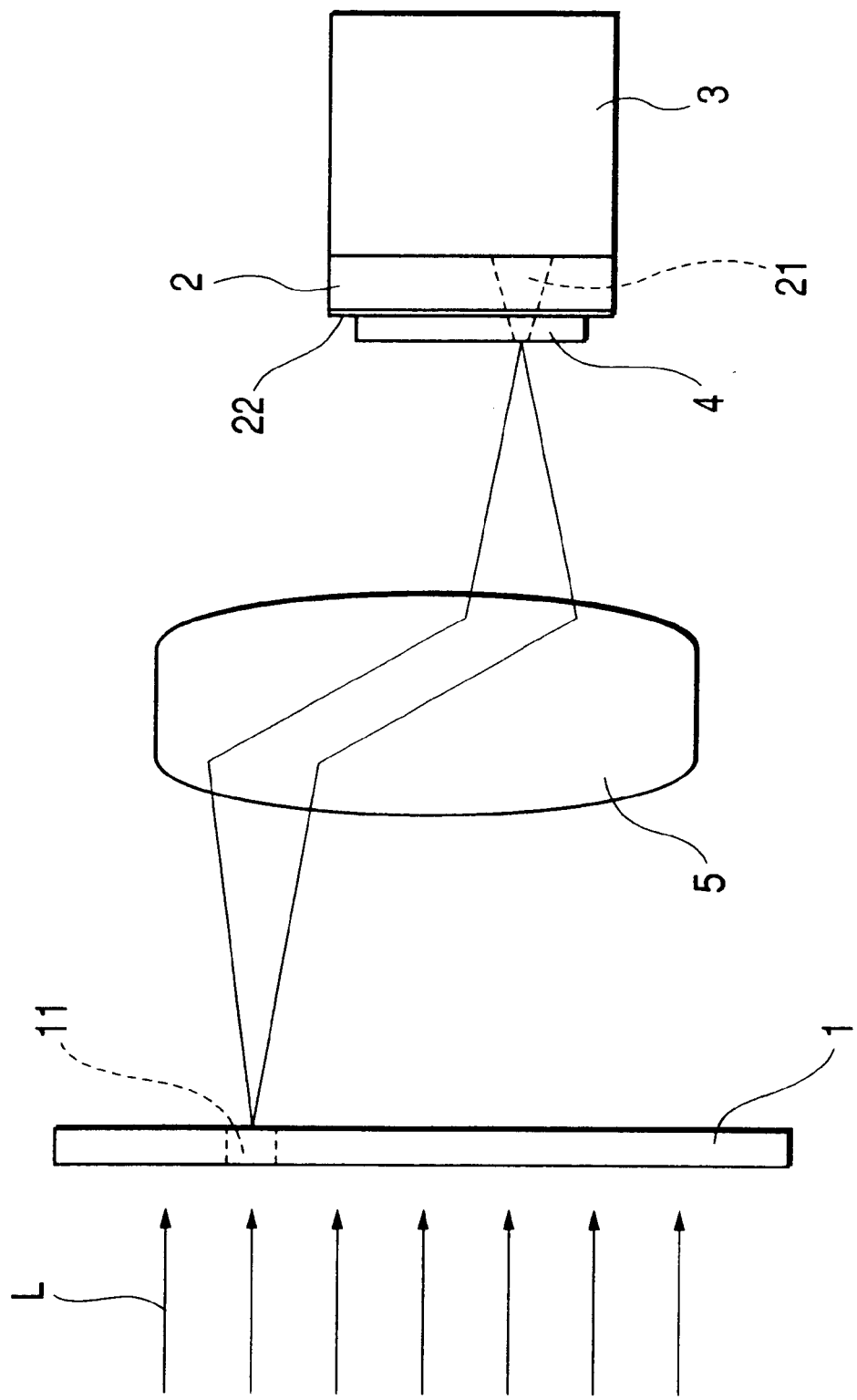
FIG. 2 is a schematic view showing a processing method for a discharge nozzle for a liquid jet recording head according to a second embodiment of the present invention.

A processing method according to the present embodiment is a method to irradiate high energy ultraviolet laser light L from the liquid discharge side of an orifice plate 2 as shown in FIG. 2, and to project and form an image of a discharge port pattern 11 on a mask plate 1 onto the orifice plate 2 by a projecting lens 5 for processing a discharge nozzle 21. Its processing process is substantially identical with the above described first embodiment. More specifically, a liquid jet recording head is formed by installing the orifice plate 2 to a liquid jet recording head body 3 for combining, and a sacrifice layer 4 capable of being processed by laser light is brought into tight contact with the outside surface of the orifice plate 2 in the liquid jet recording head for joining. By irradiating ultraviolet laser light L through the mask plate 1, the pattern 11 on the mask plate 1 is projected by a projecting lens 5 to focus an image thereof on the orifice plate 2, and the orifice plate 2 containing a repellent layer 22 made of macromolecular organic material and the sacrifice layer 4 are, in a direction of their thickness, sublimed and processed in a traveling direction of each laser light. On the orifice plate 2, a plurality of discharge nozzles 21 having a tapered configuration which tapers in the liquid discharging direction (mask plate side) are simultaneously formed. In this respect, in the present embodiment, the traveling direction of the laser light is determined by the NA (Numerical Aperture) of the projecting lens.

The discharge nozzle 21 is processed by irradiating laser light L in the same manner as shown in FIG. 3A, and after completion of the processing, by removing the sacrifice layer 4 by a chemical or physical method, the discharge nozzle 21 of the orifice plate 2 is formed such that an edge on the incoming radiation side (that is, liquid discharge side) of the laser light has a sharp shape free of any inactive processed portion as shown in FIG. 3B.

Further, a repellent layer 22 coated on the outside surface of the orifice plate 2 can be protected without being deteriorated or damaged by the irradiation of laser light because of the existence of the sacrifice layer 4 as in the case of the above described embodiment.

Next, with reference to FIGS. 5 and 6, the description will be made of a third embodiment concerning treatment of debris, which is a secondary product occurring when the orifice plate made of macromolecular organic material is laser processed.

The debris, which is a secondary product occurring when the discharge nozzle is processed and formed as in the case of each embodiment described above, disperses within liquid passages in the liquid jet recording head to adhere to their wall surfaces and the like, and its surface energy and hydrophilic force affect the flow of recording liquid and adhere to a heating conductor for generating discharge energy of the recording liquid. Thus, there arises a problem that this contaminated heating conductor deteriorates the heat generating efficiency.

Figure 5:
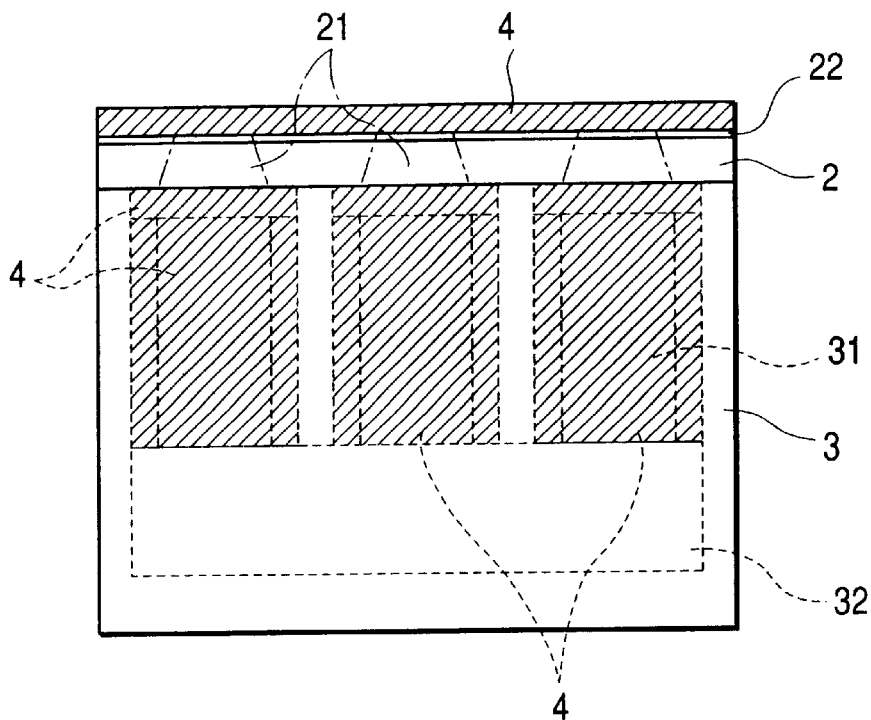
FIG. 5 is a schematic view for explaining an embodiment in which there is removed the secondary product occurring at the time of laser processing in a processing method for a discharge nozzle for a liquid jet recording head according to a third embodiment of the present invention.
Figure 6:
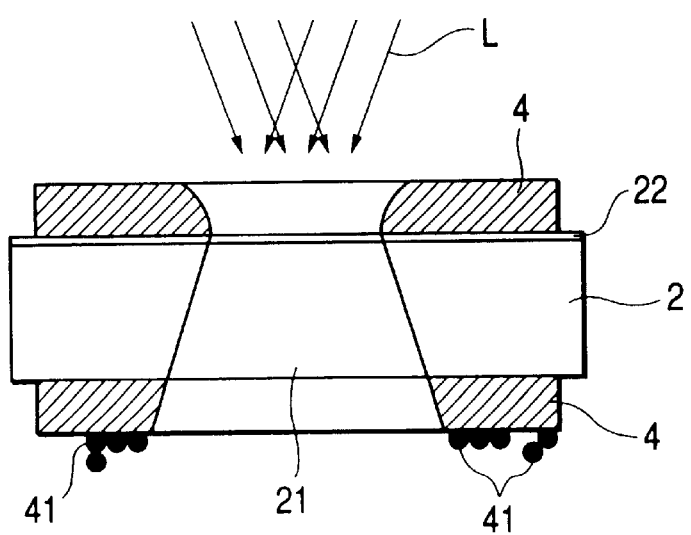
FIG. 6 is a schematic view showing an orifice plate portion for explaining an embodiment in which there is removed the secondary product occurring at the time of laser material processing in a processing method for a discharge nozzle for a liquid jet recording head according to a third embodiment of the present invention.

In the present embodiment, as shown in FIG. 5, the sacrifice layer 4 is brought into tight contact with the inside surface of the orifice plate 2 and wall surfaces of liquid passages 31 in the liquid jet recording head body 3 respectively in advance as in the case of the outside surface of the orifice plate 2, debris occurring in the discharge nozzle processing process is caused to adhere onto the sacrifice layers 4, and after the processing, the sacrifice layers 4 are removed to thereby exclude the debris at the same time. Further, with reference to FIG. 6 which schematically shows this state, the description will be made. Before the laser processing, the sacrifice layer 4 is brought into tight contact with both the outside surface of the orifice plate 2 on the laser light incoming radiation side and the inside surface thereof, which is the opposite side, respectively in advance, and when the discharge nozzle 21 is processed by irradiating laser light L, debris 41 occurring in this laser processing adheres to the sacrifice layer 4 on the inside surface of the orifice plate 2. After completion of the processing, the sacrifice layers 4 on both inside and outside surfaces of the orifice plate 2 are removed, whereby the debris 41 adhering to the sacrifice layers 4 can be simultaneously removed. Thus, on the outside surface of the orifice plate 2, the edge of the discharge nozzle 21 on the incoming radiation side (that is, liquid discharge side) of laser light is formed sharp, and the repellent layer 22 is also protected. On the inside surface of the orifice plate 2, the debris 41 adhered to the sacrifice layer 4 is removed together with the sacrifice layer 4. Therefore, the problem resulting from the existence of the debris caused in the laser processing can be resolved.

In this respect, this debris removing method is effective even in the case where the discharge nozzle is processed and formed with the orifice plate in a single state, and can be performed as described above.

Figure 7A:
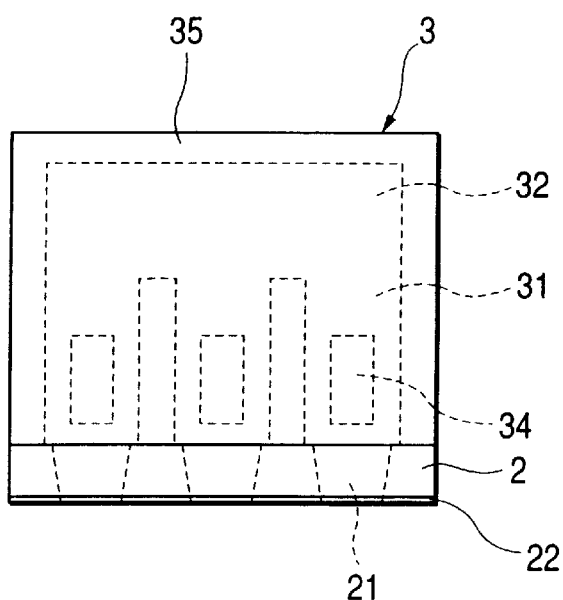
FIGS. 7A, 7B and 7C are schematic views showing a liquid jet recording head to be manufactured by a manufacturing method for liquid jet recording head according to the present invention.
Figure 7B:
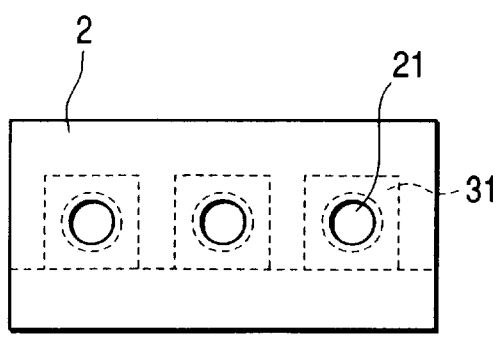
Figure 7C:
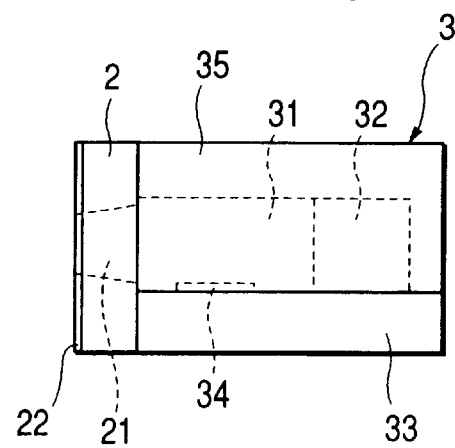

With reference to FIGS. 7A to 7C, the description will be made of the liquid jet recording head whose discharge nozzles are processed and formed as in the case of each embodiment described above.

In FIGS. 7A to 7C, reference numeral 33 denotes a substrate (base plate), and on this substrate 33, there is provided a liquid discharge pressure generating element 34 such as electrothermal transducers and electromechanical transducers for discharging recording liquid. This liquid discharge pressure generating element 34 is disposed within a liquid passage 31 conductively connected to the discharge nozzle 21, and individual liquid passages 31 are conductively connected to a common liquid chamber 32. To this common liquid chamber 32, a liquid supply tube (not shown) is connected, and recording liquid is supplied from a recording liquid tank through the liquid supply tube. Reference numeral 35 denotes a ceiling plate having a concave portion for forming the liquid passage 31 and the common liquid chamber 32, and this ceiling plate 35 is joined to the substrate 33 to thereby constitute the liquid jet recording head body 3 for forming the liquid passage 31 and the common liquid chamber 32. Further, on the liquid passage end portion side of the liquid jet recording head body 3, there is provided the orifice plate 2 equipped with the discharge nozzle 21.

In a liquid jet recording head to be manufactured according to the present invention, the recording liquid is replenished from the recording liquid tank to the common liquid chamber 32 through a liquid supply port (not shown) in the liquid jet recording head body 3, and is supplied from the common liquid chamber 32 to the liquid passage 31, and further to the discharge nozzle 21. Bubbling formation pressure caused by a heater 34 formed as the film on the surface of the substrate 33 causes the recording liquid within the liquid passage 31 to fly from the discharge nozzle 21 as droplets. By this process, printing is performed. In the discharge nozzle 21 processed according to the present invention, since the edge on the liquid discharge side is formed sharp, de-watering at discontinuance of the recording liquid during liquid discharge is improved, errors in the discharging direction of the recording liquid due to its surface tension are reduced, and further occurrence of mist at discontinuance of the recording liquid substantially never happens. As a result, the printing quality has been remarkably improved.

Such a liquid jet recording head can be manufactured as follows. A heater 34, which is an exothermic resistive element for generating heat energy as energy to be utilized for discharging the liquid, and integrated and electric wiring such as a shift register (not shown) are patterned onto a silicon substrate to prepare the substrate (base plate) 33, and a concave portion, which serves as the liquid passage 31 and the common liquid chamber 32, and the liquid supply port (not shown) are formed by performing chemical etching on a silicon plate to prepare a ceiling plate 35. Thereafter, the substrate 33 and the ceiling plate 35 are alignment-joined in such a manner that their arrangement is in good agreement with that of the liquid discharge side end surface, the concave portion which serves as the liquid passage 31, and the heater 34, to form the liquid jet recording head body 3. Then, the orifice plate 2 with the discharge nozzle in a not-formed state is bonded to the liquid discharge side end surface of the liquid jet recording head body 3. In this state, the discharge nozzle 21 is processed and formed by using the above-described discharge nozzle processing method, and thereafter, the liquid jet recording head can be assembled by combining an electric substrate, into which a terminal for driving a heater (not shown) is patterned, combining a heat sink for heat radiation, and further combining a holder for holding each member and a recording liquid tank for supplying recording liquid.

As described above, according to the present invention, the edge of the discharge nozzle on the liquid discharge side can be formed in a sharp shape, and the repellent layer on the outside surface of the orifice plate is not deteriorated nor damaged by the irradiation of laser light by the existence of the sacrifice layer. Also, the repellent layer can also be protected. Also, the inside surface of the orifice plate on the liquid supply side and the liquid passage wall surface within the liquid jet recording head are simultaneously attached with the sacrifice layers, and these sacrifice layers are removed after laser processing, whereby it is possible to exclude debris which is a processing secondary product, and the interior of the liquid jet recording head can be prevented from being contaminated by debris. Further, since it becomes possible to process and form the discharge nozzle in a final process after the liquid jet recording head is assembled, nonisotropic liquid discharging direction resulting from deformation due to assembly of the orifice plate can be resolved. Also, it is possible to form the discharge nozzle having a taper configuration which tapers on the liquid discharge side of the discharge port formation plate, and to form the edge of the discharge nozzle on the liquid discharge side into a sharp shape. Since de-watering at discontinuance of the recording liquid during liquid discharge is improved, errors in the discharging direction of the recording liquid due to its surface tension can be reduced, and further occurrence of mist at discontinuance of the recording liquid can be eliminated. As a result, the discharging direction of droplets is stabilized at a certain direction, and the flying speed of the droplets to be discharged is improved, whereby the printing quality of the liquid jet recording head is remarkably improved and high-speed printing becomes possible.

What is claimed is:

1. A processing method for a discharge nozzle in a liquid jet recording head for processing and forming the discharge nozzle in a discharge port formation plate by irradiation of laser light, comprising the steps of:

providing a surface of the discharge port formation plate on a liquid discharge side with a sacrifice layer made of material capable of being processed by the laser light;

processing and forming a discharge nozzle in the discharge port formation plate by irradiation of the laser light from the liquid discharge side of the discharge port formation plate; and removing the sacrifice layer.

2. A processing method for a discharge nozzle in a liquid jet recording head for processing and forming the discharge nozzle in a discharge port formation plate by irradiation of laser light, comprising the steps of:

providing both a surface of the discharge port formation plate on a liquid discharge side and a surface on a liquid supply side, or both the surface of the discharge port formation plate on the liquid discharge side and a wall surface of a liquid passage, with sacrifice layers made of material capable of being processed by the laser light;

processing and forming a discharge nozzle in the discharge port formation plate by irradiation of the laser light from the liquid discharge side of the discharge port formation plate; and removing the sacrifice layers.

3. The processing method for a discharge nozzle in a liquid jet recording head according to claim 1 or 2, wherein a water-soluble resin is used as the sacrifice layer, the sacrifice layer is formed by applying the water-soluble resin, and the water-soluble resin as the sacrifice layer is removed by rinsing after processing of the discharge nozzle.

4. The processing method for a discharge nozzle in a liquid jet recording head according to claim 1 or 2, a wherein resinous film is used as the sacrifice layer, the resinous film is vacuum bonded onto the surface of the discharge port formation plate on the liquid discharge side, and the resinous film as the sacrifice layer is removed by mechanical peeling after the discharge nozzle is processed.

5. The processing method for a discharge nozzle in a liquid jet recording head according to claim 1 or 2, wherein a high energy ultra violet laser is used as a laser used to process the discharge nozzle, and a resin as the sacrifice layer and the discharge port formation plate are sublimed and processed by a photo-chemical reaction process.

6. The processing method for a discharge nozzle in a liquid jet recording head according to claim 1 or 2, wherein a high energy short pulse oscillation laser is used as a laser used to process the discharge nozzle, and a resin as the sacrifice layer and the discharge port formation plate are sublimed and processed by a thermo-chemical reaction process.

7. The processing method for a discharge nozzle in a liquid jet recording head according to claim 1 or 2, wherein the surface of the discharge port formation plate on the liquid discharge side is formed with a repellent layer coated with repellent in advance.

8. A method for manufacturing a liquid jet recording head by processing and forming a discharge nozzle in a discharge port formation plate by irradiation of laser light, said method comprising the steps of:

providing a surface of the discharge port formation plate on a liquid discharge side with a sacrifice layer made of material capable of being processed by the laser light;

processing and forming the discharge nozzle in the discharge port formation plate by irradiation of laser light from the liquid discharge side of the discharge port formation plate; and removing the sacrifice layer.

9. A method for manufacturing a liquid jet recording head by processing and forming a discharge nozzle in a discharge port formation plate by irradiation of laser light, said method comprising the steps of:

providing sacrifice layers made of material capable of being processed by the laser light on both surfaces of the discharge port formation plate on a liquid discharge side and on a liquid supply side, or on the surface of the discharge port formation plate on the liquid discharge side and a wall surface of a liquid passage;

processing and forming a discharge nozzle in the discharge port formation plate by irradiation of laser light from the liquid discharge side of the discharge port formation plate; and removing the sacrifice layers.

10. The method for manufacturing a liquid jet recording head according to claim 8 or 9, wherein, of each member constituting the entire liquid jet recording head, after the discharge port formation plate, on which a plurality of discharge ports are formed, and a member for holding the discharge port formation plate are combined, each discharge nozzle is processed and formed by irradiation of the laser light from the liquid discharge side of the discharge port formation plate.

11. The method for manufacturing a liquid jet recording head according to claim 8 or 9, wherein a water-soluble resin is used as the sacrifice layer, the sacrifice layer is formed by applying the water-soluble resin, and after the discharge nozzle is processed, the water-soluble resin as the sacrifice layer is removed by rinsing.

12. The method for manufacturing a liquid jet recording head according to claim 8 or 9, wherein a resinous film is used as the sacrifice layer, the resinous film is vacuum bonded onto the surface of the discharge port formation plate on the liquid discharge side, and after the discharge nozzle is processed, the resinous film as the sacrifice layer is removed by mechanical peeling.

13. The method for manufacturing a liquid jet recording head according to claim 8 or 9, wherein a high energy ultra violet laser is used as a laser used to process the discharge nozzle, and a resin as the sacrifice layer and the discharge port formation plate are sublimed and processed by a photo-chemical reaction process.

14. The method for manufacturing a liquid jet recording head according to claim 8 or 9, wherein a high energy short pulse oscillation laser is used as a laser used to process the discharge nozzle, and a resin as the sacrifice layer and the discharge port formation plate are sublimed and processed by a thermo-chemical reaction process.

15. The method for manufacturing a liquid jet recording head according to claim 8 or 9, wherein the surface of the discharge port formation plate on the liquid discharge side is formed with a repellent layer by coating with a water repellent in advance.

16. The method for manufacturing a liquid jet recording head according to claim 8 or 9, further comprising providing an exothermic element for generating heat energy to be utilized in order to discharge the liquid from the discharge nozzle.

* * * * *

UNITED STATES PATENT AND TRADEMARK OFFICE
CERTIFICATE OF CORRECTION

PATENT NO. : 6,515,255 B1
DATED : February 4, 2003
INVENTOR(S) : Koide

It is certified that error appears in the above-identified patent and that said Letters Patent is hereby corrected as shown below:

Column 1,
Line 33, "process." should read -- process --.

Column 2,
Line 39, "of objects" should read -- of the objects --.

Column 10,
Line 47, "a wherein" should read -- wherein a --.

Signed and Sealed this

Eleventh Day of November, 2003

JAMES E. ROGAN
*Director of the United States Patent and Trademark Office*